C. J. CONNER.
ELECTRICAL TESTING APPARATUS.
APPLICATION FILED NOV. 6, 1915.
1,225,014.
Patented May 8, 1917.
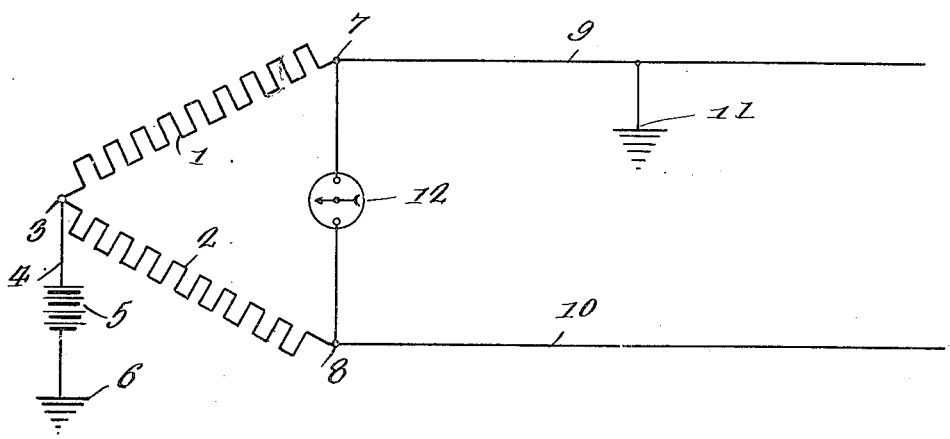
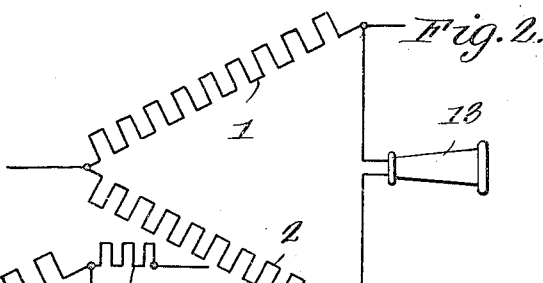
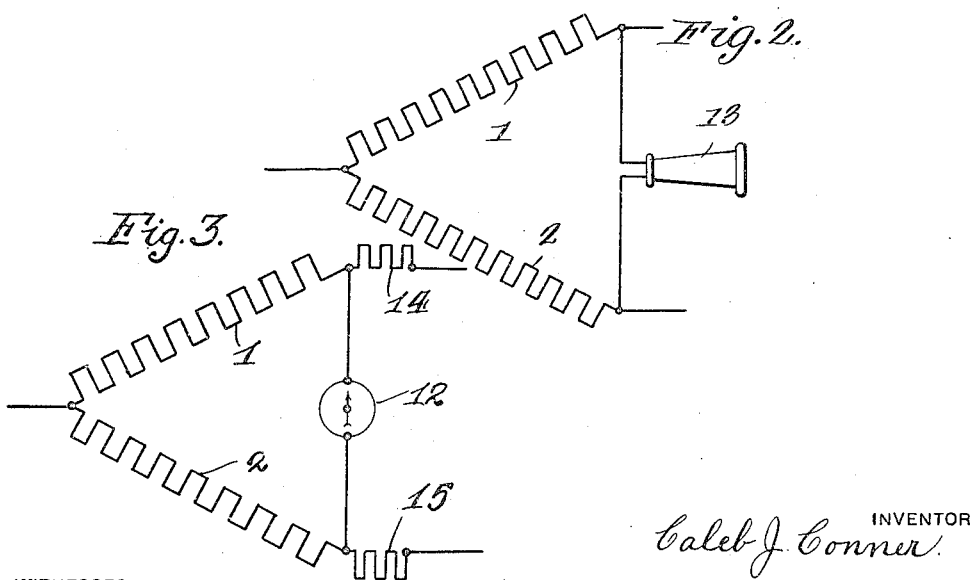
INVENTOR
Caleb J. Conner
WITNESSES
BY
ATTORNEY

UNITED STATES PATENT OFFICE.

CALEB J. CONNER, OF COATESVILLE, PENNSYLVANIA.

ELECTRICAL TESTING APPARATUS.

1,225,014. Specification of Letters Patent. Patented May 8, 1917.

Application filed November 6, 1915. Serial No. 60,043.

*To all whom it may concern:*

Be it known that I, CALEB J. CONNER, a citizen of the United States, residing at Coatesville, in the county of Chester and State of Pennsylvania, have invented certain new and useful Improvements in Electrical Testing Apparatus, of which the following is a specification.

My invention relates to electrical testing apparatus and more particularly to an arrangement of non-inductive resistances and a galvanometer whereby to indicate approximately the point in an electrical circuit at which a fault such as a ground, short circuit or the like may exist and to indicate when said fault has been passed by the party searching for the same.

The primary object of my invention resides in the provision of a pair of non-inductive resistance elements having at one of each of their extremities connection with a source of electrical energy, the opposite extremities of said elements having connection with the line wires of a telephone, power, or similar transmission line, a suitable galvanometer or similar indicator being shunted across the line wires.

Another object of the invention is to indicate when the break, ground or the like fault has been passed, the device not indicating the exact location of said fault.

With the above and other objects in view my invention resides preferably in the construction, combination, and arrangement of parts as hereinafter set forth in the specification as illustrated in the accompanying drawing, in which, Figure 1 is a diagrammatic view of one application of my invention.

Fig. 2 is a modified form of the invention, and

Fig. 3 is a diagrammatic view of a modified form of my invention.

Similar reference characters designate similar parts throughout the various views of the drawing.

In the drawing, I have diagrammatically illustrated the preferred arrangement of my invention, I having provided two non-inductive resistance elements 1 and 2 jointly connected at 3 to a conductor 4 leading to one side of a suitable source of electrical energy such as a battery or the like 5. The opposite pole of the battery is grounded, as indicated at 6. The free terminals of the resistance elements 1 and 2 are connected at the points 7 and 8 respectively with the conductors 9 and 10 of a telephone, power or other similar electrical transmission line in which a fault exists, the fault being shown in the form of a ground 11 on the conductor 9. A galvanometer 12 or similar potential indicator is shunted across the free terminal of the resistance elements 1 and 2 and connected at points 7 and 8.

In use, the device is connected as shown, and a lineman may be sent out to shunt or short circuit the conductors 9 and 10 at various points. The galvanometer will remain at the neutral point until the fault is passed, this being due to the fact that the difference of potential when the conductors are short circuited remains constant in both of the resistance elements 1 and 2, flowing through the conductors 9 and 10 through the ground 11 and thence back through the ground 6 to the source of energy. However, when the ground or other fault is passed, then the length of the conductor 10 will be varied relative to the conductor 9 so that current flowing through both of said conductors will be of a different potential value relative to each thereby causing a difference of potential to exist at the terminals of the galvanometer 12 causing a deflection of the needle. This will indicate clearly the fact that the point at which the fault exists has been passed. In Fig. 2, a telephone receiver 13 has been shown, it being preferable to embody in the telephone receiver the non-inductive resistances 1 and 2, this form of the invention being connected in the manner similar to that of the first described form.

The advantage of this arrangement resides in the fact that no complicated apparatus is necessary, neither is it necessary to disconnect branch lines from a trunk line in order to locate a fault existing on one of the branch lines. It is, of course, necessary that the conductors 9 and 10 have like resistance co-efficients. In the devices heretofore offered it is possible on the single line to locate exactly where a fault exists, but where a system of branches are associated with the trunk line, it is necessary to disconnect each branch and separately test it, whereas in my invention it is only necessary to send a lineman out over the various branches until the fault is located.

In some instances a line or circuit of comparatively low resistance may be under test, and in such a case the galvanometer may be rendered inoperative. To anticipate such a condition I have provided a modified form of my invention illustrated in Fig. 3, wherein the non-inductive coils 1 and 2 of the first described form of my invention are provided, as shown, as well as the galvanometer 12. A plurality of non-inductive resistance elements 14 and 15 are placed in series with the circuit to be tested and connected to the free ends of the resistance elements 1 and 2, as shown, whereby resistance will be always interposed in the circuit being tested. In this form of my invention it is practically impossible to place a shunt around the galvanometer 12 and affect its sensitiveness to any appreciable extent.

From the above description taken in connection with the accompanying drawing, it is thought that a clear and comprehensive understanding of the construction, operation and advantages of my invention may be readily gathered and while I have shown and described the same as embodying a specific structure, I reserve the right to make changes therein which do not depart from the spirit and scope of the invention as claimed.

I claim:

The method of finding grounds on electrical lines which consists in bridging the lines by a pair of resistors and an electrical detector, applying a source of potential between ground and the junction of said pair of resistors, and shunting the lines temporarily from place to place.

In testimony whereof I affix my signature in presence of two witnesses.

CALEB J. CONNER.

Witnesses:
 STERLING F. WRIGHT,
 WILLIAM S. G. COOK.

Copies of this patent may be obtained for five cents each, by addressing the "Commissioner of Patents, Washington, D. C."